(12) United States Patent
Umstead

(10) Patent No.: US 10,058,173 B2
(45) Date of Patent: Aug. 28, 2018

(54) SHELVING ASSEMBLY AND METHOD OF ASSEMBLY

(71) Applicant: Proos Manufacturing, Inc., Grand Rapids, MI (US)

(72) Inventor: Steve Umstead, Grand Rapids, MI (US)

(73) Assignee: Proos Manufacturing, Inc., Grand Rapids, MI (US)

( * ) Notice: Subject to any disclaimer, the term of this patent is extended or adjusted under 35 U.S.C. 154(b) by 0 days.

(21) Appl. No.: 15/806,982

(22) Filed: Nov. 8, 2017

(65) Prior Publication Data

US 2018/0125232 A1 May 10, 2018

Related U.S. Application Data

(60) Provisional application No. 62/418,825, filed on Nov. 8, 2016.

(51) Int. Cl.
| | |
|---|---|
| *A47B 43/00* | (2006.01) |
| *A47B 57/54* | (2006.01) |
| *A47B 57/34* | (2006.01) |
| *A47B 47/00* | (2006.01) |
| *A47B 57/06* | (2006.01) |

(52) U.S. Cl.
CPC .......... *A47B 57/54* (2013.01); *A47B 47/0075* (2013.01); *A47B 57/34* (2013.01); *A47B 57/06* (2013.01)

(58) Field of Classification Search
CPC ..... A47B 57/54; A47B 57/34; A47B 47/0075; A47B 57/06
USPC ............. 211/153, 135, 187, 186, 134, 90.01, 211/90.02, 88.01, 87.01, 86.01, 57.1; 248/235, 239, 241, 243, 250, 220.31, 248/220.41, 220.42, 220.43; 108/108, 108/110, 107, 147.17
See application file for complete search history.

(56) References Cited

U.S. PATENT DOCUMENTS

| | | | | |
|---|---|---|---|---|
| 567,002 | A | * | 9/1896 | Poindexter ............. A47B 57/42 248/243 |
| 1,227,703 | A | * | 5/1917 | Ulrich ..................... A47B 57/58 108/61 |
| 1,238,215 | A | * | 8/1917 | Terrell ................... A47B 47/03 211/134 |

(Continued)

*Primary Examiner* — Abigail E Troy
*Assistant Examiner* — Devin K Barnett
(74) *Attorney, Agent, or Firm* — Varnum, Riddering, Schmidt & Howlett LLP

(57) ABSTRACT

A shelf assembly and method of assembling the same are generally presented. The shelf assembly includes a back shelf wall having one or more mounting ports therein. Each mounting port may include one or more ear openings and a foot opening. A shelf may be provided to be connected to the back shelf wall. The shelf may include a surface and at least one flange extending from the surface. A mounting bracket may be inserted through openings in the flange and into the mounting port to connect the shelf to the back shelf wall. The mounting bracket may include a body, one or more ears extending from a first side of the body, and a foot, extending from a second side of the body. The foot may include a head portion and a neck portion. The foot opening may include a top slot portion and a bottom slot portion contiguous with the top slot portion. The foot may be inserted into the foot opening and seated in the bottom slot portion to lock the mounting clip in place.

16 Claims, 6 Drawing Sheets

(56) References Cited

U.S. PATENT DOCUMENTS

| | | | | |
|---|---|---|---|---|
| 1,375,855 A * | 4/1921 | O'Connor | A47B 57/58 | 108/60 |
| 1,423,861 A * | 7/1922 | Levene | A47B 57/22 | 108/60 |
| 1,462,670 A * | 7/1923 | Vance | A47B 57/16 | 211/135 |
| 1,487,856 A * | 3/1924 | Hauserman | A47B 47/025 | 108/60 |
| 1,504,523 A * | 8/1924 | Sherer | A47B 57/30 | 108/102 |
| 1,527,543 A * | 2/1925 | Ellenbecker | F16B 12/46 | 108/161 |
| 1,554,011 A * | 9/1925 | Lehman | A47B 57/18 | 108/107 |
| 1,560,436 A * | 11/1925 | Staples | A47B 96/02 | 108/28 |
| 1,577,066 A * | 3/1926 | Medart | A47B 57/40 | 108/109 |
| 1,584,575 A * | 5/1926 | Waelti | A47B 96/061 | 211/90.01 |
| 1,599,654 A * | 9/1926 | Cranston | A47B 96/022 | 211/153 |
| 1,775,391 A * | 9/1930 | Fassinger | F16L 3/221 | 248/243 |
| 1,853,018 A * | 4/1932 | Knape | A47B 57/425 | 248/243 |
| 1,880,179 A * | 9/1932 | Onions | A47B 57/42 | 108/107 |
| 1,917,917 A * | 7/1933 | Bales | A47B 96/1416 | 211/134 |
| 1,962,396 A * | 6/1934 | Katz | A47B 57/42 | 108/152 |
| 1,963,427 A * | 6/1934 | Tyler | A47B 47/024 | 108/110 |
| 2,374,658 A * | 5/1945 | Bales | A47B 57/425 | 211/153 |
| 2,424,217 A * | 7/1947 | Bales | A47B 47/03 | 211/135 |
| 2,553,960 A * | 5/1951 | De Swart | A47B 57/425 | 126/337 R |
| 2,601,201 A * | 6/1952 | Bales | A47B 57/58 | 108/60 |
| 2,604,213 A * | 7/1952 | Bales | A47B 57/482 | 108/188 |
| 2,708,088 A * | 5/1955 | Steinke | H05K 7/1421 | 248/221.12 |
| 2,788,096 A * | 4/1957 | Franks | F16B 12/50 | 403/176 |
| 2,841,353 A * | 7/1958 | Burdick | A47F 5/0823 | 248/220.21 |
| 2,954,125 A * | 9/1960 | Husted | A47F 5/0823 | 108/149 |
| 2,961,724 A * | 11/1960 | Alling | F16B 2/24 | 248/220.43 |
| 3,081,717 A * | 3/1963 | Yurevich | A47B 57/30 | 108/107 |
| 3,087,702 A * | 4/1963 | Anderson | A47B 57/20 | 248/243 |
| 3,216,587 A * | 11/1965 | Anders | A47B 57/58 | 108/61 |
| 3,244,391 A * | 4/1966 | Brunette | A47F 5/0823 | 211/106.01 |
| 3,255,722 A * | 6/1966 | Ferdinand | A47B 57/18 | 108/107 |
| 3,269,338 A * | 8/1966 | Shewell | A47B 47/021 | 108/109 |
| 3,294,250 A * | 12/1966 | Evans | A47B 57/22 | 108/147.15 |
| 3,294,351 A * | 12/1966 | Rollins, Jr. | A47B 96/028 | 211/90.03 |
| 3,326,149 A * | 6/1967 | Mitchell | A47B 47/04 | 108/60 |
| 3,330,229 A * | 7/1967 | Ferdinand | A47B 57/20 | 108/107 |
| 3,392,689 A * | 7/1968 | Ferdinand | A47B 57/18 | 108/110 |
| 3,397,934 A * | 8/1968 | Dushek | A47B 57/06 | 108/144.11 |
| 3,422,775 A * | 1/1969 | Johnsson | A47B 57/16 | 108/109 |
| 3,438,344 A * | 4/1969 | Ferdinand | A47B 57/16 | 108/110 |
| 3,452,954 A * | 7/1969 | Lucietto | A47F 5/0823 | 185/40 R |
| 3,485,189 A * | 12/1969 | Marco | A47B 57/46 | 108/109 |
| 3,489,290 A * | 1/1970 | Larson | A47B 57/04 | 211/190 |
| 3,489,382 A * | 1/1970 | Larson | A47F 5/0823 | 211/105.2 |
| RE27,186 E * | 10/1971 | Ferdinand | A47B 57/44 | 108/107 |
| 3,677,416 A * | 7/1972 | Block | A47B 57/18 | 108/161 |
| 3,754,517 A * | 8/1973 | Hassel | A47B 47/03 | 108/107 |
| 3,844,231 A * | 10/1974 | Peacock | A47B 57/42 | 108/107 |
| 3,939,985 A * | 2/1976 | Hochman | A47F 5/0823 | 248/220.22 |
| 4,121,801 A * | 10/1978 | Kellogg | A47B 96/068 | 108/152 |
| 4,148,263 A * | 4/1979 | Suttles | A47F 5/101 | 108/1 |
| 4,269,318 A * | 5/1981 | Levitt | A47B 96/021 | 211/135 |
| 4,372,516 A * | 2/1983 | Nyquist | A47B 96/067 | 211/90.01 |
| 4,405,052 A * | 9/1983 | Spiros | A47B 57/50 | 211/187 |
| 4,405,110 A * | 9/1983 | Gibbons | A47F 5/0823 | 248/220.22 |
| 4,448,314 A * | 5/1984 | Weiller | A47F 5/02 | 211/131.1 |
| 4,463,510 A * | 8/1984 | Windish | A47F 5/0869 | 211/54.1 |
| 4,513,669 A * | 4/1985 | Steinke | A47B 57/48 | 108/107 |
| 4,592,286 A * | 6/1986 | Trubiano | A47B 57/545 | 108/108 |
| 4,681,233 A * | 7/1987 | Roth | B25H 3/04 | 211/70.6 |
| 4,687,094 A * | 8/1987 | Allsop | A47F 5/0823 | 206/45.26 |
| 4,708,311 A * | 11/1987 | Clausen | A47F 5/0846 | 211/87.01 |
| 4,941,632 A * | 7/1990 | Couls | A47F 5/0823 | 248/220.43 |
| 5,350,073 A * | 9/1994 | Thornley | A47B 57/22 | 108/107 |
| 5,456,435 A * | 10/1995 | Sweeney | A47B 57/40 | 211/90.01 |
| 5,485,929 A * | 1/1996 | Danon | A47F 5/0869 | 211/45 |
| 5,735,221 A * | 4/1998 | Benayon | A47B 47/024 | 108/107 |
| 5,743,416 A * | 4/1998 | Yemini | B25H 3/04 | 211/70.6 |
| 5,746,328 A * | 5/1998 | Beeler | A47F 1/126 | 211/59.3 |
| 5,871,187 A * | 2/1999 | Pihlaja | A47B 57/42 | 248/214 |
| 5,901,523 A * | 5/1999 | Tasi | A47B 57/54 | 248/223.41 |
| 5,957,060 A * | 9/1999 | Rosenband | A47B 57/22 | 108/107 |
| 6,065,724 A * | 5/2000 | Arslan | A47B 96/06 | 211/187 |

(56) References Cited

U.S. PATENT DOCUMENTS

| | | | | |
|---|---|---|---|---|
| 6,070,747 A * | 6/2000 | Shea | A47F 5/0807 | 211/103 |
| 6,126,022 A * | 10/2000 | Merkel | A47B 47/042 | 108/180 |
| 6,164,215 A * | 12/2000 | Cook | A47B 96/04 | 108/60 |
| 6,164,610 A * | 12/2000 | Santiago | A47B 96/022 | 211/90.01 |
| 6,199,706 B1 * | 3/2001 | Shea | A47F 5/08 | 211/103 |
| 6,209,831 B1 * | 4/2001 | Kiplinger | A47F 5/0869 | 211/59.1 |
| 6,234,328 B1 * | 5/2001 | Mason | A47B 57/045 | 211/150 |
| 6,273,281 B1 * | 8/2001 | Berglund | A47B 57/50 | 108/107 |
| 6,289,618 B1 * | 9/2001 | Kump | A47F 5/0823 | 248/220.42 |
| 6,321,475 B1 * | 11/2001 | Glanz | A47F 5/0068 | 248/220.41 |
| 6,349,909 B1 * | 2/2002 | Zarrow | A47F 5/0823 | 211/57.1 |
| 6,405,984 B1 * | 6/2002 | Simons | A47F 5/0807 | 211/70.6 |
| 6,481,678 B1 * | 11/2002 | Chong | H02G 3/288 | 211/192 |
| D473,080 S * | 4/2003 | Kellogg | D6/706 | |
| 6,705,477 B1 * | 3/2004 | Narkis | A47B 57/588 | 211/153 |
| 6,793,070 B2 * | 9/2004 | Dye | A47F 5/112 | 206/45.24 |
| 7,044,312 B2 * | 5/2006 | Yang | A47B 57/40 | 211/187 |
| 7,694,925 B2 * | 4/2010 | Kokenge | A47F 5/0807 | 248/220.42 |
| 7,826,208 B2 * | 11/2010 | Wang | H05K 7/1489 | 174/666 |
| 7,909,184 B2 * | 3/2011 | Clark | A47F 7/021 | 211/189 |
| 8,042,700 B1 * | 10/2011 | Smalley | A47F 5/0807 | 211/88.01 |
| D724,876 S * | 3/2015 | Gokhale | D6/705 | |
| 9,215,939 B2 * | 12/2015 | Zobel | A47F 5/0823 | |
| 2001/0054593 A1 * | 12/2001 | Grassman | A47F 7/0028 | 211/14 |
| 2002/0195410 A1 * | 12/2002 | Lin | A47B 57/16 | 211/190 |
| 2003/0071181 A1 * | 4/2003 | Valiulis | A47F 5/0823 | 248/220.43 |
| 2003/0164432 A1 * | 9/2003 | Shea | A47F 5/0807 | 248/220.31 |
| 2003/0230685 A1 * | 12/2003 | Valiulis | A47F 5/0823 | 248/220.31 |
| 2004/0221772 A1 * | 11/2004 | Narkis | A47B 57/588 | 108/60 |
| 2004/0237853 A1 * | 12/2004 | Sholz | A47B 57/40 | 108/107 |
| 2005/0103734 A1 * | 5/2005 | Saltzberg | A47B 57/50 | 211/187 |
| 2005/0218280 A1 * | 10/2005 | Rojas | A47F 5/0815 | 248/220.31 |
| 2005/0263465 A1 * | 12/2005 | Chung | A47B 96/021 | 211/90.02 |
| 2006/0213848 A1 * | 9/2006 | Kim | H05K 7/1489 | 211/90.01 |
| 2006/0278782 A1 * | 12/2006 | Lockwood | A47F 5/0823 | 248/220.31 |
| 2008/0251667 A1 * | 10/2008 | Swayne | B60R 13/0206 | 248/220.31 |
| 2010/0258693 A1 * | 10/2010 | Toshima | A47B 96/06 | 248/250 |
| 2011/0006181 A1 * | 1/2011 | Johnston | A47F 5/0823 | 248/220.41 |
| 2011/0155875 A1 * | 6/2011 | Hofman | A47F 5/0815 | 248/220.31 |
| 2012/0018601 A1 * | 1/2012 | DeVito | A47F 5/0807 | 248/220.42 |
| 2014/0034593 A1 * | 2/2014 | Chen | A47B 57/50 | 211/134 |
| 2014/0320040 A1 * | 10/2014 | Katu | F25D 27/00 | 315/292 |
| 2015/0313378 A1 * | 11/2015 | Mason | F16M 13/022 | 248/205.2 |
| 2015/0335155 A1 * | 11/2015 | Winker | A47B 87/005 | 211/90.02 |
| 2016/0000219 A1 * | 1/2016 | Lager | A47B 21/02 | 248/220.43 |
| 2017/0000270 A1 * | 1/2017 | Will | A47G 1/20 | |
| 2017/0143121 A1 * | 5/2017 | Grice | A47B 96/028 | |
| 2017/0347812 A1 * | 12/2017 | Will | F16B 15/0023 | |

* cited by examiner

SHELVING ASSEMBLY AND METHOD OF ASSEMBLY

CROSS REFERENCE TO RELATED APPLICATION

This application claims priority to U.S. Provisional Patent Application No. 62/418,825 filed on Nov. 8, 2016 and entitled SHELVING ASSEMBLY, the disclosure of which is hereby incorporated by reference.

FIELD OF INVENTION

The present invention generally relates to the field of assembled shelving and more specifically to a unique shelf and clip system for assembling and installing shelving units and other devices and a method of assembling the same.

BACKGROUND

A wide variety of shelving units and assemblies exist in the market today. Commonly, these shelving units comprise a back shelf wall and side walls or partitions that extend outward from the back shelf wall. Shelves may then be connected or placed between the sidewalls, using any appropriate supporting method, such as pegs hooks, or the like. However, this type of shelving design suffers from numerous drawbacks. Among the drawbacks to this design is the inability to access the shelf from any direction, as the side walls impede access from anywhere but the front of the shelving unit. Further, pegs and the like do not permanently fix or lock the shelf to the back wall and therefore allow the shelf to move, even at unwanted times.

Other shelf designs include brackets for supporting the shelves. While such designs may allow for increased access to the shelf from all sides, such designs also suffer from numerous drawbacks. First, shelving brackets are typically large and take up space under a shelf, decreasing the amount of usable space of the shelf beneath. Second, many bracket designs do not lock and therefore may allow the shelf to become dislodged if it is bumped or jostled.

Accordingly, an improved design for a shelving assembly is needed in the industry.

SUMMARY

A shelf assembly and method of assembling the same are generally presented. The shelf assembly includes a back shelf wall having one or more mounting ports therein. Each mounting port may include one or more ear openings and a foot opening. A shelf may be provided to be connected to the back shelf wall. The shelf may include a surface and at least one flange extending from the surface. The flange may include one or more flange openings therein, such as openings that generally correspond to the ear and foot openings of the mounting port.

A mounting bracket may be provided to connect the shelf to the back shelf wall. The mounting bracket may include a body, one or more ears extending from a first side of the body, and a foot, extending from a second side of the body. The mounting clip may be insertable through the flange openings and into the mounting port to connect the shelf to the back shelf wall. For example, the ears may be inserted through the flange openings and into the ear openings and the foot may be inserted through the flange openings and through the foot opening.

In an embodiment, the foot may include a head and a neck. The head may have a width that is greater than the neck. The foot opening may include a top slot portion and a bottom slot portion contiguous with the top slot portion. The bottom slot portion may have a width that is less than the top slot portion. Specifically, the top slot portion may have a width that is greater than the width of the head, and the bottom slot portion may have a width that is less than the width of the head but greater than the width of the neck.

The mounting clip may include two ears, such as two ears arranged symmetrically with respect to the body. The ears may comprise a first portion extending generally perpendicularly away from the body and a second portion extending away from the first portion.

In use, the shelf flange openings may be aligned with the mounting port and the mounting clip inserted therethrough. The ears may be inserted into the ear openings and the foot may be inserted into the foot opening. When inserted all the way into the mounting port, the mounting clip may then be pulled down to seat the neck in the bottom slot portion and lock the clip into the mounting port.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
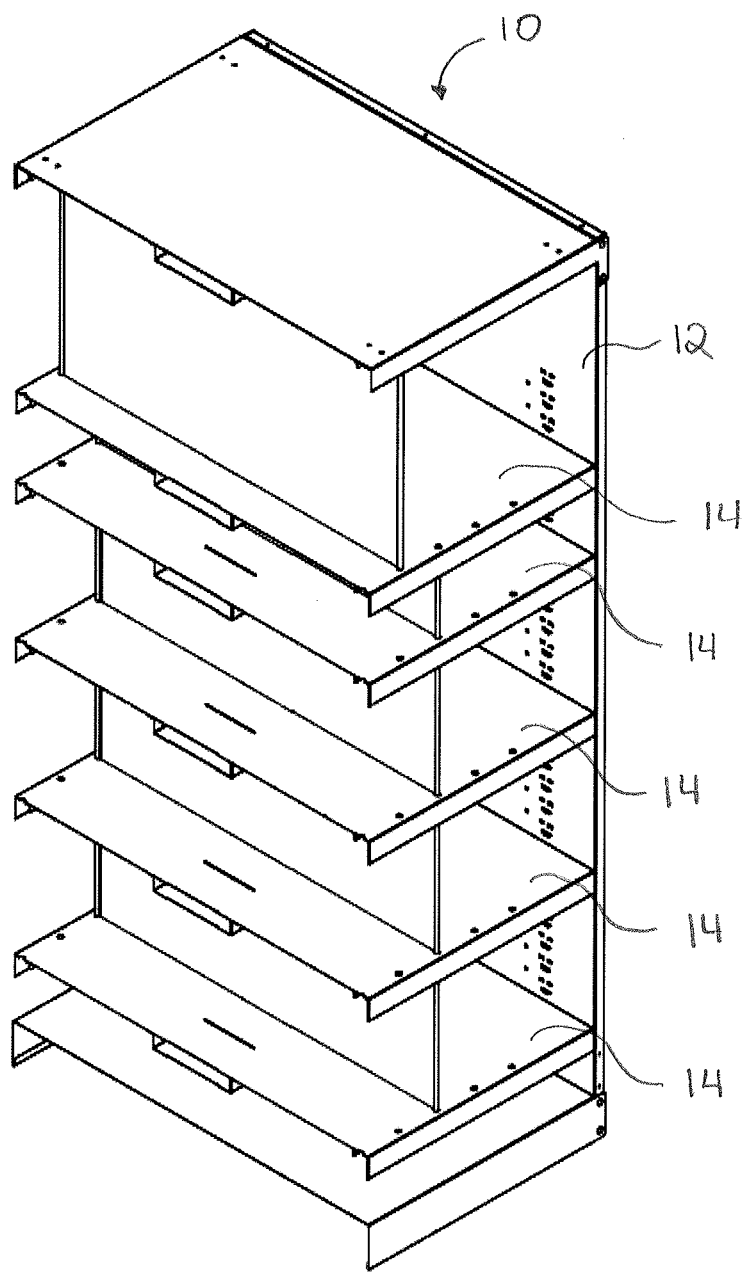
FIG. 1 illustrates a perspective view a shelving assembly.

A shelving assembly 10 is generally presented, as shown in FIG. 1. The shelving assembly 10 comprises a plurality of components, including a back shelf wall 12, shelves 14, and a mounting clip 16. The shelving assembly 10 may further include additional components as illustrated in the drawings and/or as described below. The shelving assembly 10 may be configured to hold a plurality of shelves 14 in adjustable alignment to allow for storage of goods.

The shelving assembly 10 may include a back shelf wall 12, as shown in FIG. 1. The back shelf wall 12 may be formed of any appropriate material, such as steel, plastic, or the like. The back shelf wall 12 may be arranged vertically and extend from a lower end of the shelving assembly 10 to an upper end of the shelving assembly 10. As described below, the back shelf wall 12 may provide a plurality of connection points for shelves 14 to allow for adjustable placement of the shelves 14 along the outer face of the back shelf wall 12.

Figure 2:
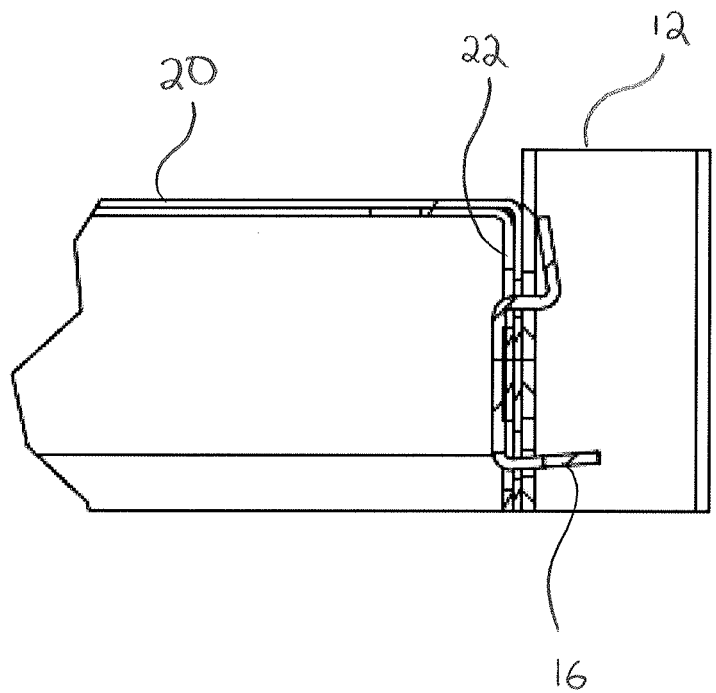
FIG. 2 illustrates a side view of a shelf flange attached to a shelf wall by a locking clip.
Figure 3:
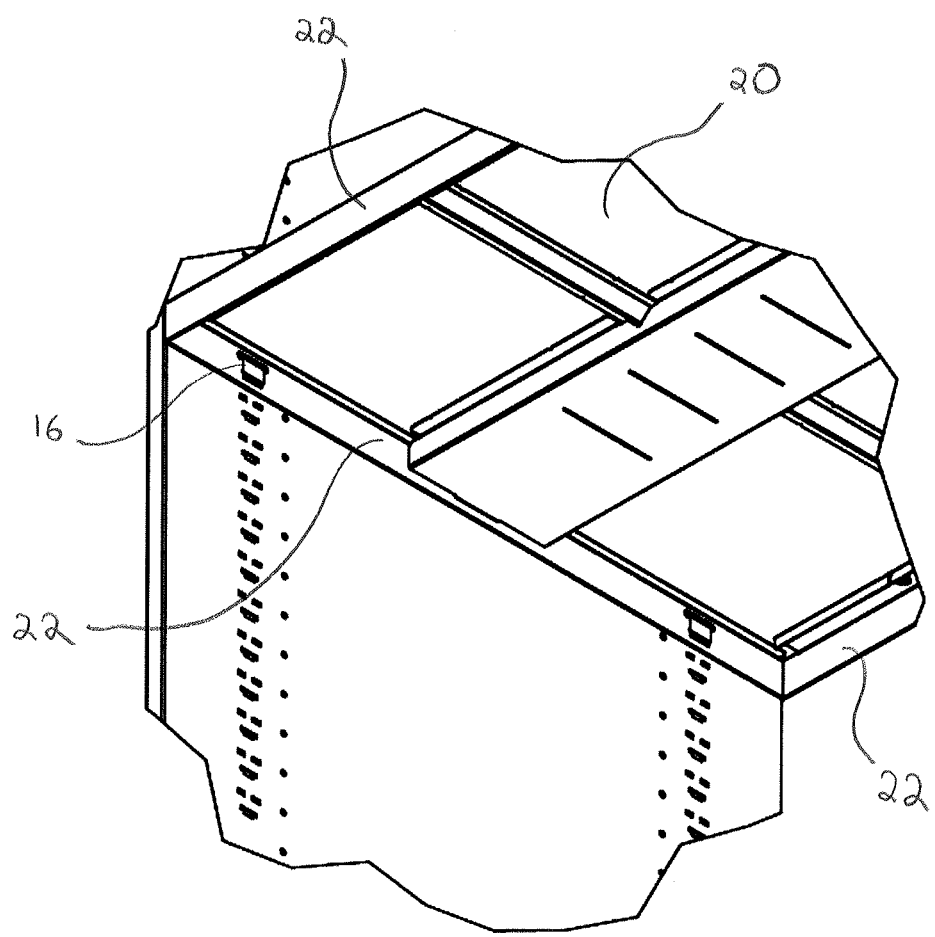
FIG. 3 illustrates an underside view of a shelf flange attached to a shelf wall by a locking clip.

FIG. 2 illustrates an embodiment of a shelf 14 connected to a back shelf wall 12. The shelf 14 may be any appropriate shape, such as rectangular, and may be formed of any appropriate material, such as steel, plastic, or the like. The shelf 14 may comprise a platform 20 and one or more flanges 22 extending away from the edges of the shelf 14. As shown in FIGS. 2 and 3, a flange 22 may abut the outer face of the back shelf wall 12 and be secured thereto to support the shelf and any contents placed thereon, as described below.

The shelf 14 may be mounted to a back shelf wall 12 by one or more mounting clips 16. The mounting clips 16 may be designed to secure the shelf 14 to the back shelf wall 12 without any additional needed support or connection. The mounting clip 16 may be formed of any appropriate material, such as metal, and may be designed and shaped as described below and shown in the FIGS.

Figure 4A:
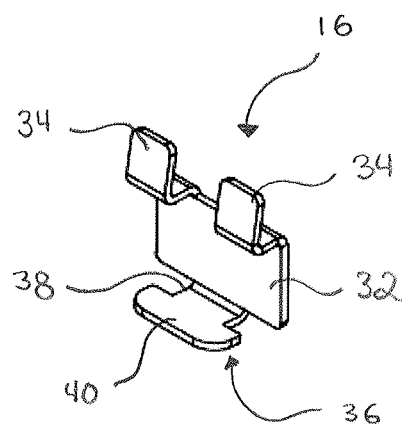
FIG. 4a illustrates a perspective view of a locking clip.
Figure 4B:
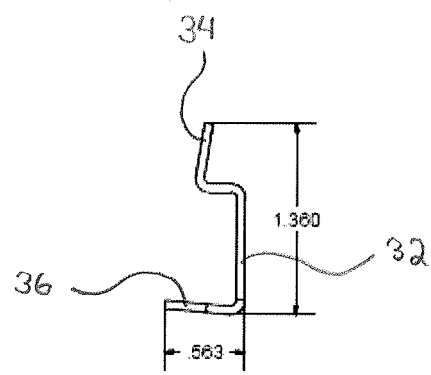
FIG. 4b illustrates a side view of a locking clip.

As illustrated in FIGS. 4a and 4b, the mounting clip 16 may include a body 32, a pair of ears 34, and a foot 36. The body 32 may comprise a flat portion, such as a generally rectangular portion having a top edge, side edges, and a bottom edge, arranged generally vertically as oriented in FIG. 4a. The body 32 may interconnect the ears 34 and the foot 36.

The mounting clip 16 may include one or more ears 34, such as two ears 34. The two ears 34 may be arranged generally symmetrically with respect to the body 32. The ears 34 may extend generally perpendicularly from the body 32 away from a top edge 37 a given length, then curve upward, away from the body 32, forming an L-shaped ear, as shown in FIGS. 4a and 4b. The portion of the ears 34 that extends upward may be angled slightly with respect to the body 32, such as angled slightly back toward the body 32. The two ears 34 may be spaced apart and approximately parallel to one another.

The foot 36 may extend from a bottom edge of the body 32 away from the body 32 in the same direction as the ears 34. The foot 36 may be arranged generally perpendicular to the body 32. As shown in FIG. 4a, the foot 36 may comprise a neck portion 38 and a head 40. The neck portion 38 may connect to the bottom edge of the body 32 and extend away from the body 32. The head 40 may comprise an end portion of the foot 36 and may be enlarged to have a greater width than the neck 38, as shown in FIG. 4a.

Figure 5:
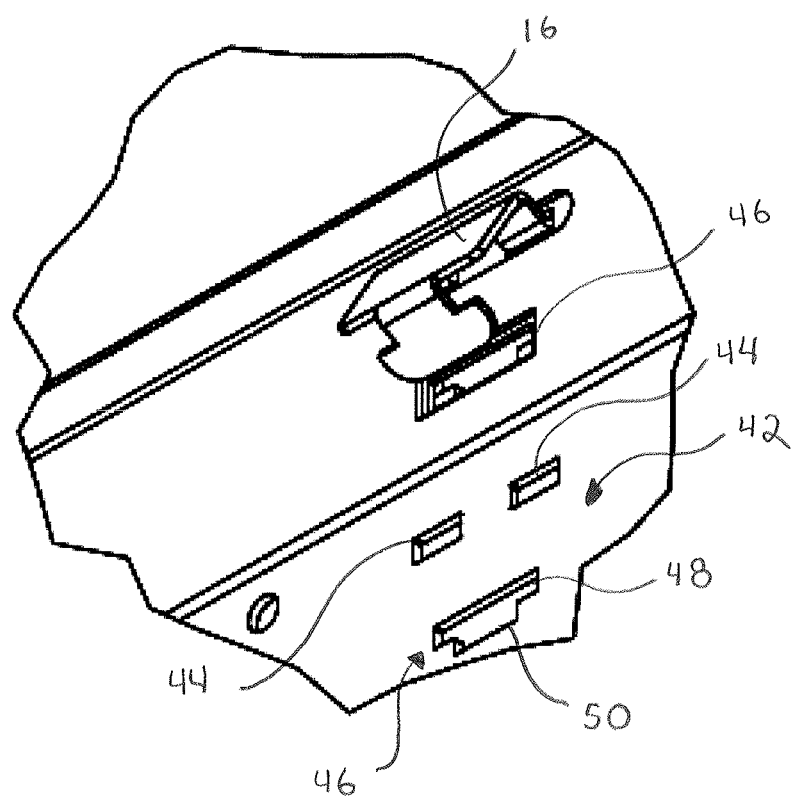
FIG. 5 illustrates a bottom view of a locking clip in partially inserted position in a shelf wall clip receptacle.
Figure 6:
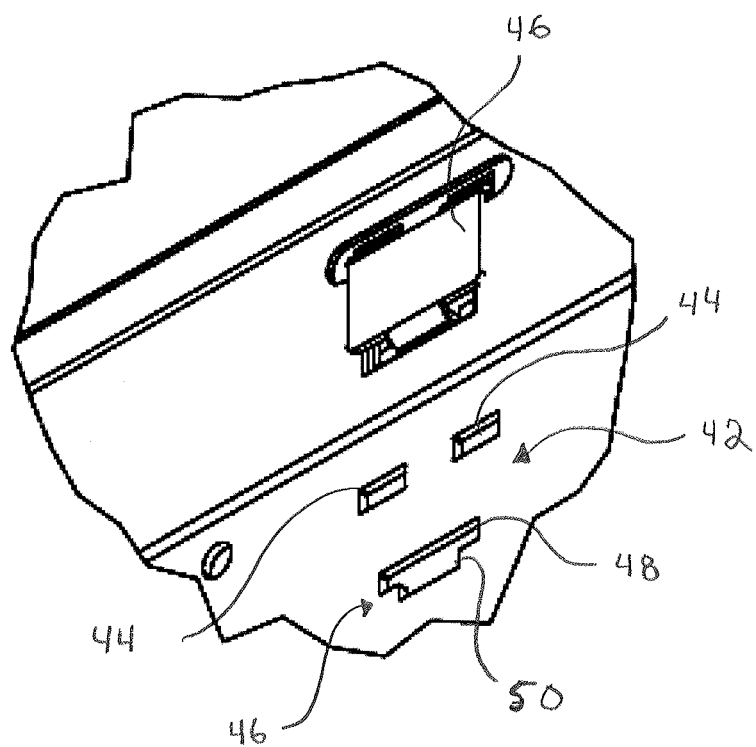
FIG. 6 illustrates a bottom view of a locking clip in fully inserted and locked position in a shelf wall clip receptacle.

The mounting clip 16 may be configured to align and connect with a similarly shaped mounting port 42 in the back shelf wall 12. As illustrated in FIGS. 5 and 6, the mounting port 42 may include a plurality of openings configured to align with portions of the mounting clip 16 to receive the portions therein. As described below, the mounting port 42 may further be configured to allow the mounting clip 16 to lock therein and retain a shelf in a desired position fixed to the back shelf wall 12.

The mounting port 42 may include one or more ear openings 44, such as two ear openings 44 to correspond with two ears 34 on the mounting clip 16. The ear openings 44 may be specifically positioned to align with the ears 34 on the mounting clip 16. For example, as shown in FIGS. 5 and 6, the mounting port 42 may include two ear openings 44 each comprising a horizontal slot sized and shaped to receive an ear 34 therein. The ear openings 44 may be arranged approximately parallel with one another and spaced apart to align with the end portion of the ears 34.

The mounting port 42 may further include a foot opening 46, located below the ear opening 44. The foot opening 46 may include a top slot portion 48 and bottom slot portion 50. The top and bottom slot portions 48, 50 may be integral to form one contiguous opening 46, as illustrated in FIG. 5. The top slot portion 48 may have a width at least as wide as the width of the head 40 to allow the entire foot 36 to be inserted into the foot opening 46. The bottom slot 50 may extend directly below the top opening 48, continuous therewith to allow movement between the top and bottom slots 48, 50. The bottom slot 50 may have a width that is less than the width of the head 40 but greater than the width of the neck 38 to allow the neck 38 to rest therein while restricting the head 40 from pulling out of the opening 46 when the neck 38 is seated in the bottom slot 48.

The shelf 14 may include openings, similarly spaced and shaped to the mounting port 42. For example, the flange 22 may include a pair of openings at least as big as the ear openings 44 and aligned with the ear openings 44 to allow the ears 34 to pass through the flange and into the ear openings 44. Likewise, the flange 22 may include an opening at least as big as the foot opening 44 and aligned with the foot opening 44 to allow the foot 36 to pass through the flange 22 and into the foot opening 46.

In use, the shelf 14 may be arranged to abut the back shelf wall 12 such that the flange openings are aligned with the mounting port 42 openings as described above. The tip of the ears 34 may be inserted through the flange 22 and into the ear openings 44. The mounting clip 16 may then be tilted to allow the ears 34 to curve upwards and behind the back shelf wall 12. The ears 34 may angle back toward the body to abut a rear side of the back shelf wall 12.

Once the ears 34 are inserted into the mounting port 42, as shown in FIG. 5, the foot 36 may be inserted into the top slot 48 in the foot opening 46, as shown in FIG. 6. The mounting clip 16 may then be pivoted to allow the foot 36 to be fully inserted into the top slot 48, with the body 32 inserted fully toward the flange 22. The clip 16 may then be pulled downward to seat and lock the clip 16 and the shelf 14 into desired position. When pulled down, the neck 38 may move from the top slot 48 to the bottom slot 50. The smaller width of the bottom slot 50 may prevent the head 40 from pulling away from or out of the foot opening 46, thereby locking the mounting clip 16 in the mounting port 42 and preventing the shelf 14 from pulling away from the back shelf wall 12.

The shelving assembly 10 described herein includes a plurality of functional benefits over alternative designs. The mounting clip 16 and related mounting configuration allow for a shelf 14 to be mounted to a back shelf wall 12 without side panels that restrict access to the shelf's contents. The mounting clip 16 further allows a shelf to be mounted to the back shelf wall 12 without any arms or protrusions underneath the shelf 14 that constrict the space between shelves 14. Finally, the locking design of the mounting clip 16 and mounting port 42 allow the shelf 14 to be fixed into a desired position without extra hardware, such as screws and the like.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

I claim:

1. A shelf assembly comprising:
   a back shelf wall having at least one mounting port therein, each mounting port comprising a plurality of ear openings and a foot opening below the ear openings;
   a shelf comprising:
      a generally planar top surface for supporting items thereon; and
      a flange extending downwardly and perpendicularly from the top surface,
      the flange including a plurality of flange openings therein;
   a mounting clip comprising:
      a generally planar body;
      a plurality of ears extending from a top side of the body wherein an upper portion of each of the ears extends upwardly relative to the body; and a foot, extending generally horizontally from a bottom side of the body, wherein the ears are spaced apart defining a gap therebetween, the foot is horizontally offset from each of the ears and horizontally aligned with the gap; wherein the upper portions of the ears are generally perpendicular relative to the foot; wherein the body, the ears, and the foot of the mounting clip are formed as a unitary one-piece structure;
   wherein the ears and the foot of the mounting clip are configured to be inserted through corresponding flange openings of said plurality of flange openings and into corresponding ear openings and a corresponding foot opening of said at least one mounting port to connect the shelf to the back shelf wall.

2. The shelf assembly of claim 1, wherein the foot includes a head portion and a neck portion, the head portion having a greater width than a width of the neck portion.

3. The shelf assembly of claim 2, wherein each foot opening includes a top slot portion and a bottom slot portion contiguous with the top slot portion, and wherein each bottom slot portion has a width that is less than a width of each top slot portion.

4. The shelf assembly of claim 3, wherein each top slot portion has a width that is greater than the width of the head portion and wherein each bottom slot portion has a width that is less than the width of the head portion and greater than the width of the neck portion.

5. The shelf assembly of claim 1, wherein the plurality of ears comprises two ears, wherein the two ears are arranged symmetrically on the top side of the body.

6. The shelf assembly of claim 1, wherein the ears of the mounting clip each comprise a lower portion extending from the body in a horizontal direction and oriented generally perpendicular to the body, wherein the upper portion of each ear extends upwardly from the lower portion of each ear.

7. The shelf assembly of claim 6, wherein the upper portion of each ear extends from the lower portion of each ear upwardly away from the body and at an angle between perpendicular and parallel to the body.

8. The shelf assembly of claim 1, wherein the body is generally rectangular shaped.

9. A method of assembling a shelf comprising:
   providing a back shelf wall having one or more mounting ports therein, each mounting port comprising a plurality of ear openings and a foot opening below the ear openings;
   providing the shelf, the shelf having a generally planar top surface for supporting items thereon and a flange extending downwardly and perpendicularly from the top surface, the flange including a plurality of flange openings therein;
   aligning the flange openings with a corresponding mounting port of said one or more mounting ports on the back shelf wall;
   providing a mounting clip, the mounting clip comprising a generally planar body, a plurality of ears extending from a top side of the body, wherein an upper portion of each of the ears extends upwardly relative to the body, and a foot extending generally horizontally from a bottom side of the body; wherein the ears are spaced apart defining a gap therebetween, the foot is horizontally offset from each of the ears and horizontally aligned with the gap; wherein the upper portions of the ears are generally perpendicular relative to the foot; wherein the body, the ears, and the foot of the mounting clip are formed as a unitary one-piece structure;
   inserting the ears and the foot of the mounting clip through corresponding flange openings of said plurality of flange openings and into the ear openings and the foot opening respectively of said corresponding mounting port to connect the shelf to the back shelf wall.

10. The method of claim 9, wherein the foot includes a head portion and a neck portion, the head portion having a greater width than a width of the neck portion.

11. The method of claim 10, wherein each foot opening includes a top slot portion and a bottom slot portion contiguous with the top slot portion, and wherein each bottom slot portion has a width that is less than a width of each top slot portion.

12. The method of claim 11, wherein each top slot portion has a width that is greater than the width of the head portion and wherein each bottom slot portion has a width that is less than the width of the head portion and greater than the width of the neck portion.

13. The method of claim 9, wherein the plurality of ears comprises two ears; wherein the two ears are arranged symmetrically on the top side of the body.

14. The method of claim 9, wherein the ears each comprise a lower portion extending from the body in a horizontal direction and oriented generally perpendicular to the body, wherein the upper portion of each ear extends upwardly from the lower portion of each ear.

15. The method of claim 14, wherein the upper portion of each ear extends from the lower portion of each ear upwardly away from the body and at an angle between perpendicular and parallel to the body.

16. The method of claim 9, wherein the body is generally rectangular shaped.

* * * * *